US006981402B2

(12) United States Patent
Bristol

(10) Patent No.: US 6,981,402 B2
(45) Date of Patent: Jan. 3, 2006

(54) SPEED AND FLUID FLOW CONTROLLER

(75) Inventor: L. Rodney Bristol, Chalfont, PA (US)

(73) Assignee: Scott Technologies, Inc., Beachwood, OH (US)

( * ) Notice: Subject to any disclaimer, the term of this patent is extended or adjusted under 35 U.S.C. 154(b) by 0 days.

(21) Appl. No.: 10/452,040

(22) Filed: May 30, 2003

(65) Prior Publication Data
US 2004/0055363 A1 Mar. 25, 2004

Related U.S. Application Data

(60) Provisional application No. 60/384,688, filed on May 31, 2002.

(51) Int. Cl.
G01N 7/00 (2006.01)
G01N 19/10 (2006.01)

(52) U.S. Cl. .................. 73/31.03; 73/23.2; 388/823; 388/815

(58) Field of Classification Search ............ 73/31.03, 73/23.2; 388/823, 815
See application file for complete search history.

(56) References Cited

U.S. PATENT DOCUMENTS

| | | | |
|---|---|---|---|
| 3,588,654 A | 6/1971 | Balazs | |
| 3,683,253 A | 8/1972 | Rummel et al. | |
| 3,803,470 A | 4/1974 | Vesteen | |
| 3,873,814 A | 3/1975 | Mirdadian | |
| 3,950,989 A | 4/1976 | Meirowitz | |
| 4,241,299 A | 12/1980 | Bertone | |
| 4,292,574 A | 9/1981 | Sipin et al. | |
| 4,384,825 A | 5/1983 | Thomas et al. | |

(Continued)

FOREIGN PATENT DOCUMENTS

EP   000071848 A1   2/1983

(Continued)

Primary Examiner—Hezron Williams
Assistant Examiner—André K. Jackson
(74) Attorney, Agent, or Firm—Armstrong Teasdale LLP

(57) ABSTRACT

A system and method for measuring fluid flow rate in a system where fluid is pumped, such as a gas monitoring instrument where gas is pumped from a space such as a room or enclosure through a conduit to a sensor. The flow of gas through a pump is determined by measuring motor back-e.m.f. which is proportional to motor speed. In a system where motor speed is regulated by pulse width modulation of the motor drive voltage, the back-e.m.f. is sampled during intervals between the drive pulses applied to the motor, and in a further aspect the sampling is done at selected, spaced-apart or infrequent intervals such as once for every ten or once for every hundred motor drive pulses. Advantageously, in an instrument that uses a microprocessor and analog-to-digital converter to measure gas-concentration, the same microprocessor and converter can provide the PWM control of the pump, in response to the back-e.m.f. generated by the pump motor between the drive pulses. The microprocessor compares the output of the analog-to-digital converter, corresponding to the back-e.m.f., which in turn corresponds to the pump motor speed, to a set-point value, representative of the desired pump motor speed. The processor then adjusts the PWM to control the pump motor to achieve and maintain the desired speed. As a result, in a gas monitor, the gas-flow rate may be maintained close to a desired gas flow rate regardless of the voltage supplied by the battery or other voltage source, regardless of the degree to which the gas is filtered, and under a wide range of operating conditions.

34 Claims, 4 Drawing Sheets

U.S. PATENT DOCUMENTS

| | | |
|---|---|---|
| 4,527,953 A | 7/1985 | Baker et al. |
| 4,638,233 A | 1/1987 | Erdman |
| 4,884,013 A | 11/1989 | Jackson et al. |
| 4,893,067 A | 1/1990 | Bhagwat et al. |
| 5,048,115 A | 9/1991 | Venturino |
| 5,107,713 A | 4/1992 | Peck et al. |
| 5,601,413 A | 2/1997 | Langley et al. |
| 5,714,862 A | 2/1998 | Mikesell et al. |
| 5,933,795 A * | 8/1999 | Schottler et al. ............ 702/145 |
| 6,247,980 B1 * | 6/2001 | Moore et al. ................. 440/73 |
| 6,363,802 B1 | 4/2002 | Grippo et al. |
| 6,402,478 B1 | 6/2002 | Zhang et al. |

FOREIGN PATENT DOCUMENTS

JP    363223446 A    9/1988

* cited by examiner

SPEED AND FLUID FLOW CONTROLLER

CROSS REFERENCE TO A RELATED APPLICATION

Applicant claims priority based on U.S. provisional patent application No. 60/384,688 filed May 31, 2002 and entitled "Speed and Fluid Flow Controller" which is incorporated herein by reference.

BACKGROUND OF THE INVENTION

In a basic gas monitoring instrument, an electrically powered motor drives a pump to bring a sample of gas from a region or space, typically via a flexible conduit or tubing, to a sensor so that the sample of gas can be tested for a contaminant. The flow rate is affected by the fluid dynamics of the system, which can change from time to time. When the flow through the system is not constant, the gas monitoring instrument is not predictable in its operation. Prior art systems operate the pump at a flow rate greater than required to insure that the minimum required flow rate is obtained. Accordingly, it would be desirable to provide a system wherein a minimum steady flow is maintained in a manner consuming only that amount of energy necessary to maintain the minimum steady flow and even when there is resistance to flow in the system. It also would be desirable to provide such a system wherein a more reliable indication of a low flow condition is given than is provided in existing prior art gas monitoring instruments.

The characteristic response time of the gas monitoring system must be known so that the user can determine when a valid test of the safety or technical compliance of a space has been made. When a potentially hazardous space is monitored, the response time of the monitoring system is a critical parameter for the safety of persons in or entering the monitored space. In some situations, a gas-containing enclosure is monitored for compliance to specific technical requirements. The characteristic flow rate and corresponding response time of a given configuration may be determined by laboratory testing. The measured response times of various configurations are usually repeatable in field applications, provided the tested flow rate is maintained.

In a monitoring instrument having a positive-displacement pump driven by a direct current motor, an obstruction of the gas flow will result in an increased electric current through the motor. Common design practice with such pumps is to sense the motor current and indicate a "low-flow" condition when the current exceeds a predetermined limit. However, this method has a serious drawback. Motor current corresponds not only to flow obstruction, but also to such variables as motor and pump friction, lubricant temperature, diaphragm stiffness, and battery voltage. The uncertainty of the motor current at the desired threshold of minimum flow is so great that it is often necessary to indicate obstructions of the gas flow by detecting short-term increases in motor current. As a result, low-flow is indicated only when rapid decreases of the gas flow occur, such as may result from pinched tubing or pressing the probe against a flat surface. This method leaves the user exposed to the risk of undetected hazards when gas flow decreases gradually, such as by the accumulation of particles in protective filters. Such accumulation may occur over a few minutes or many days, depending on the application.

User safety and confidence may be enhanced by low-flow detection that operates independently of the rate at which gas flow declines. A gas flow sensor placed in the path of the sampled gas could provide the needed indication. Gas flow sensors employ various techniques, including differential pressure across a known flow restriction, rotation rate of a turbine, and thermal convection (mass flow). Such sensors add cost and bulk to the apparatus.

SUMMARY OF THE INVENTION

A system and method for measuring fluid flow rate to determine the response time in a system where fluid is pumped, such as a gas monitoring instrument where gas is pumped from a space such as a room or enclosure through a conduit to a sensor. The invention uses the relation between pump motion, i.e. the speed at which the pump is driven by the pump motor, and flow of gas through a pump. The invention measures the speed of the pump motor by measuring motor back-e.m.f. which is proportional to motor speed.

In a system where motor speed is regulated by Pulse Width Modulation (PWM) of the motor drive voltage, the back-e.m.f. is sampled during intervals between the drive pulses applied to the motor. The invention improves such a system by sampling the-back-e.m.f. at a rate lower than the pulse rate of the modulated drive pulses. Back-e.m.f. sampling may occur only once for ten or 100 drive pulses, for example. The reduced sampling rate permits the duty factor of the drive pulses to approach 100 percent, thereby making efficient use of voltage sources such as batteries.

Advantageously, in an instrument that uses a microprocessor and analog-to-digital (A/D) converter to measure gas-concentration, the same microprocessor and converter can provide the PWM control of the pump, in response to the back-e.m.f. generated by the pump motor between the drive pulses. The microprocessor compares the output of the analog-to-digital converter, corresponding to the back-e.m.f., which in turn corresponds to the pump motor speed, to a set-point value, representative of the desired pump motor speed. The processor then adjusts the PWM to control the pump motor to achieve and maintain the desired speed. As a result, in a gas monitor, the gas-flow rate may be maintained close to a desired gas flow rate regardless of the voltage supplied by the battery or other voltage source, regardless of the degree to which the gas is filtered, regardless of the loading of the filter, and under a wide range of operating conditions.

The foregoing and additional advantages and characterizing features of the invention will become clearly apparent upon a reading of the ensuing detailed description together with the included drawings.

DETAILED DESCRIPTION OF THE INVENTION

Figure 1:
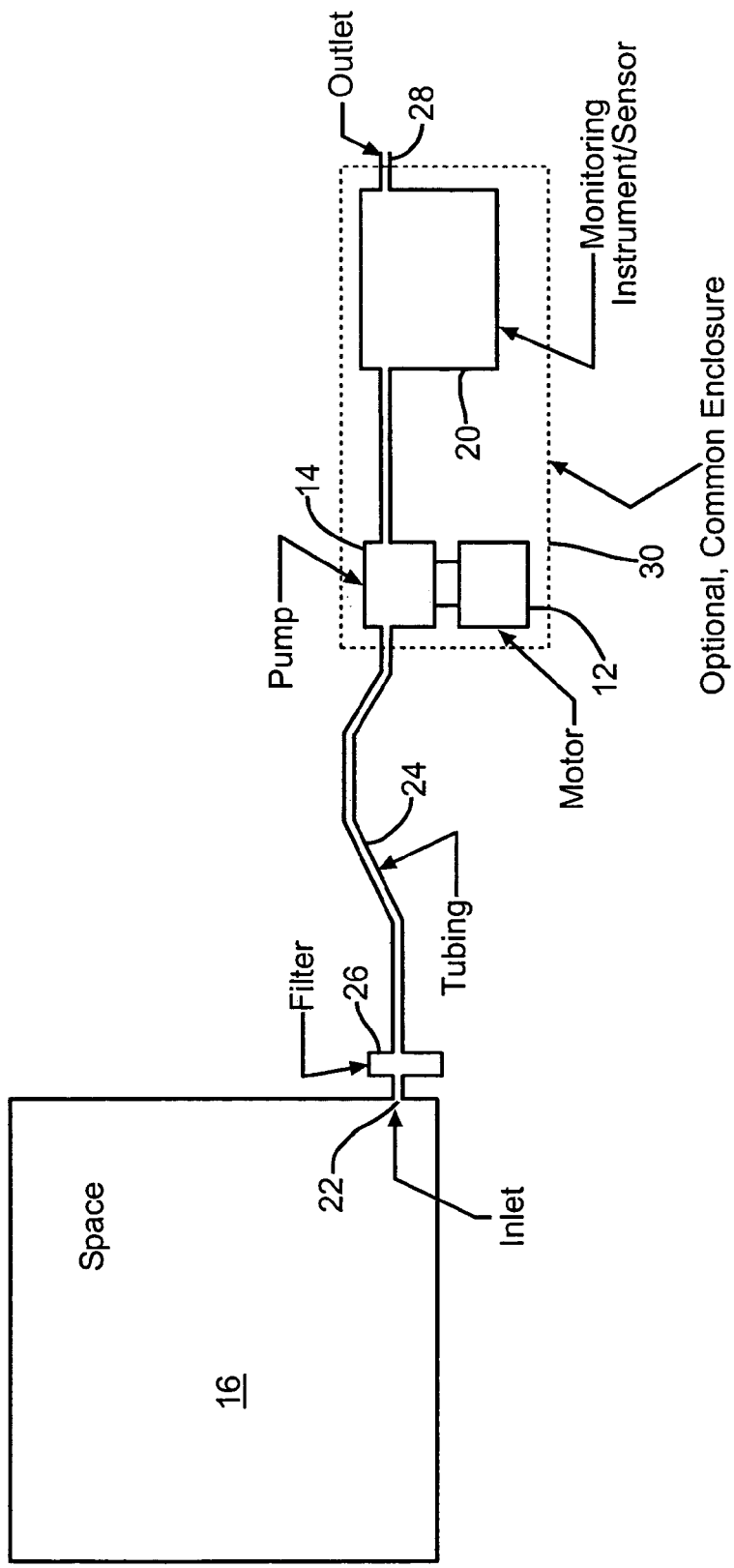
FIG. 1 is a schematic diagram illustrating a gas monitoring instrument to which the invention is applicable.

FIG. 1 is a schematic of part of a gas monitoring instrument 10 to which the present invention is applicable. The invention is not limited to a gas monitoring instrument, and the invention may be used to monitor other fluids, for example, liquids. The invention is merely illustrated using a gas monitoring instrument as an example of how the invention might be implemented. The gas monitoring instrument has an electrically powered motor 12 for driving a pump 14 to bring a sample of gas from a region or space 16, such as a room or pipe, to a sensor 20, so that the sample of gas can be tested for a contaminant. A gas inlet 22 or probe in the space 16 being tested is in gas communication with the monitoring instrument through flexible tubing 24, usually ranging from 1 meter to 30 or more meters in length. One or more filters 26 may be placed at the inlet and in the tubing to exclude particles and liquids, which could degrade the function of the tubing, the pump, or the instrument. Gas leaves the sensor via outlet 28. In the arrangement illustrated in FIG. 1, motor 12, pump 14 and sensor 20 can be housed in a common enclosure 30. Such a gas monitoring system has a characteristic response time that is primarily determined by the volume of gas contained in the tubing 24, divided by the volumetric pumping rate of the pump 14. The flow rate is affected by the fluid dynamics of the system, which may change from time to time.

The invention uses the relation between pump motion and the flow of gas through a pump. Depending on the construction of the pump, the volume of fluid may correspond, for example, to the number of strokes of a piston or the number of strokes of a diaphragm, the number of rotations of an enclosed screw, or the number of rotations of a set of articulated vanes that are arranged in an eccentric chamber to modulate the volume enclosed by adjacent vanes and the walls of the chamber through each revolution, or any other pump mechanism that moves a relatively fixed volume of material per cycle. An inertial pump, such as a fan or a centrifugal water pump, is less suited to the disclosed method, because under certain conditions the speed of rotation may increase with restricted flow.

Methods exist for measuring the speed at which a pump is driven. For example, a proximity sensor, electrical contact, or optical path interrupter may be used to count strokes of a reciprocating pump, such as a diaphragm pump. If a pump is driven by a reciprocating electromechanical driver, such as a solenoid or linear motor, the pumped volume may be determined by counting the number of cycles of the reciprocating drive. For pumps driven by rotary motors, the rotations of the system may be sensed by similar means as for reciprocating drivers, such as proximity, electrical contact, or optical sensing of one or more index features of the mechanism. Such techniques are employed in shaft encoders and tachometers. These techniques add cost and bulk to the apparatus.

A method for measuring motor speed according to the invention, from which the flow through a driven pump may be determined, is to sense the voltage generated by the motor during short interruptions of the driving voltage. An electric motor, such as those used to drive pumps associated with gas monitoring instruments, behaves as a generator when mechanically driven or when coasting as a result of inertia. When the mechanical drive is the inertia of the system, the voltage generated by the motor (which is sometimes referred to as "voltage of motion" or "back-e.m.f."), indicates how fast the motor is moving (usually turning). In a typical direct-current motor, the back-e.m.f. opposes the applied voltage such that a heavily loaded (slower turning) motor draws more current than a lightly loaded one.

The "back-e.m.f." is proportional to the speed of the motor and, typically, opposes the voltage applied externally to the motor. When the driving voltage is removed from a motor, system inertia maintains the motion of the motor and the voltage appears at the motor terminals. The voltage-of-motion is measurable after the effects of parasitic inductance and capacitance have decayed and before the speed of the motor has slowed appreciably.

A method according to the invention may be employed in a system where the speed of the pump is regulated by pulse-width-modulation (PWM) of the drive voltage. PWM is a well-known control method for adapting a varying voltage supply, such as a battery, to a known or varying load. In application to a portable, battery-powered gas monitor, the gas-flow rate may be maintained close to a desired gas flow rate regardless of the voltage supplied by the battery, regardless of the degree to which the gas is filtered, and under a wide range of operating conditions.

A method according to the invention may be advantageous in an instrument that uses a microprocessor and analog-to-digital converter to measure gas-concentration. The same microprocessor and converter can provide PWM control of the pump, in response to the back-e.m.f. generated by the pump motor between the drive pulses. The microprocessor compares the output of the analog-to-digital converter to a set-point value. The A/D output corresponds to the back-e.m.f., which corresponds to the pump motor speed. The set-point value corresponds to the desired pump motor speed which corresponds to the desired flow rate. The processor then adjusts the PWM to control the pump motor to achieve and maintain the desired speed. The processor also coordinates the timing of the back-e.m.f. measurements with the PWM.

Figure 2:
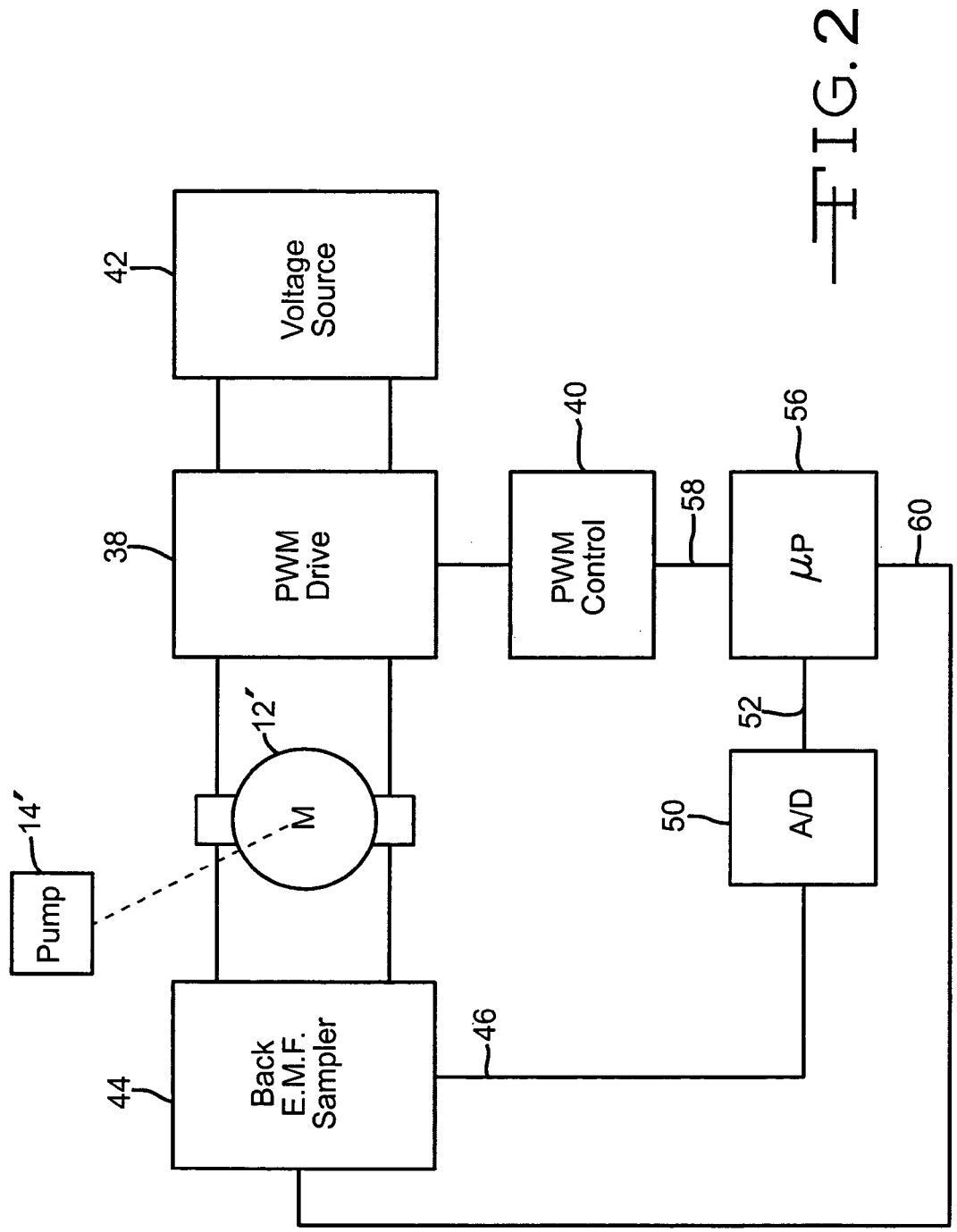
FIG. 2 is a schematic diagram of the motor control arrangement according to the invention.

Referring to FIG. 2, the foregoing is illustrated with motor 12' and pump 14' which are similar to the motor and pump included in the monitoring instrument of FIG. 1. A pulse width modulation (PWM) drive 38 is connected between a source of voltage 42, such as a battery, and motor 12' and a pulse width modulation (PWM) control 40 is operatively associated with PWM drive 38 for controlling application of motor drive pulses to motor 12'. PWM drive 38 and PWM control 40 are representative of such components readily commercially available and well-known to those skilled in the art so that a detailed description thereof is unnecessary. Suffice it to say, PWM drive 38 under control of PWM control 40 supplies drive voltage pulses to motor 12' of increasing or decreasing pulse width and/or pulse frequency when it is desired to deliver increasing or decreasing power, respectively, to motor 12' to increase or decrease the speed thereof and thereby to control the rate of flow through the system. Accordingly, the term pulse width modulation (PWM) used herein is intended to include the foregoing modes of variable pulse width and/or frequency and/or pulse magnitude so as to change the driving power to the motor, as well understood by those skilled in the art.

A voltage sampler, labeled back-e.m.f. sampler 44 in FIG. 2, is connected to motor 12' for sampling motor back-e.m.f. during intervals between drive pulses applied to motor 12' to provide a signal at the output 46 thereof which is indicative of the actual speed of motor 12'. Sampler 44 is representative of voltage sampling devices readily commercially available and well-known to those skilled in the art so that a detailed description thereof is unnecessary.

The output 46 of back-e.m.f. sampler 44 is applied to the input of an analog to digital (A/D) converter 50 to provide a digital signal at the output 52 thereof which contains information on the actual speed of motor 12', i.e. a digital representation of the motor speed. A/D converter 50 is representative of A/D converters readily commercially available and well-known to those skilled in the art so that a detailed description is unnecessary.

The output 52 of A/D converter 50 is applied to an input of a microprocessor 56 which is connected in controlling relation to PWM control 40. Microprocessor 56 compares the actual motor speed as represented by the digital signal on A/D converter output 52 to a desired motor speed programmed into microprocessor 56 and provides a control signal on output 58 corresponding to the difference between actual and desired motor speed. Output 58 is applied to PWM control 40 to cause the width of motor drive pulses to be increased or decreased to increase to decrease the motor speed depending upon the nature of the difference between actual and desired motor speeds. Another control signal output 60 from microprocessor 56 is applied to back-e.m.f. sampler 44 for a purpose which will be described. Microprocessor 56 is representative of such processors readily commercially available and well-known to those skilled in the art so that a detailed description thereof is unnecessary. By way of example, in an illustrative gas monitoring instrument, microprocessor 56 can be a programmable digital controller commercially available from Texas Instruments under the designation MSP430f149.

Although the back-e.m.f. may be sampled during some or all the intervals between drive pulses, in accordance with a feature of the invention the back-e.m.f. is sampled at spaced-apart or infrequent intervals between motor drive pulses. In other words, the back-e.m.f. is sampled at a rate lower than the pulse rate of the modulated motor drive pulses. For example, the voltage that corresponds to the gas flow rate may be sampled once for every ten or once for every hundred drive pulses. This one pulse of ten or 100 may be reduced in width or eliminated as needed by the processor to permit an accurate sample of the back-e.m.f. The other nine or 99 pulses may be as wide as needed to maintain pump motor speed. The ratio of PWM frequency to sample frequency need not be constant. It may be determined by the timing characteristics of the processor and A/D converter and by the rate of sampling needed to maintain adequate pump motor speed stability, according to well-known engineering principles. Microprocessor 56 selects the particular intervals between motor drive pulses during which back-e.m.f. is to be sampled, this being determined by a program stored within microprocessor 56. Control or timing signals for accomplishing this are on output 60 which is applied in controlling relation to back-e.m.f. sampler 44.

Advantageously, back-e.m.f. sampler 44, A/D converter 50 and PWM control 40 may be incorporated in the microprocessor. When the elements are so combined, control lines 58 and 60 represent control data and timing signals within the microprocessor, which may be coordinated using software, according to information published by the manufacturer of the microprocessor. One such publication is the "MSP430xlxx Family User's Guide", Texas Instruments document number SLAU049A. Likewise, an A/D converter may be arranged such that it provides the back-e.m.f. sampling, in which case the path 46 becomes a signal path internal to the A/D converter.

Figure 3:
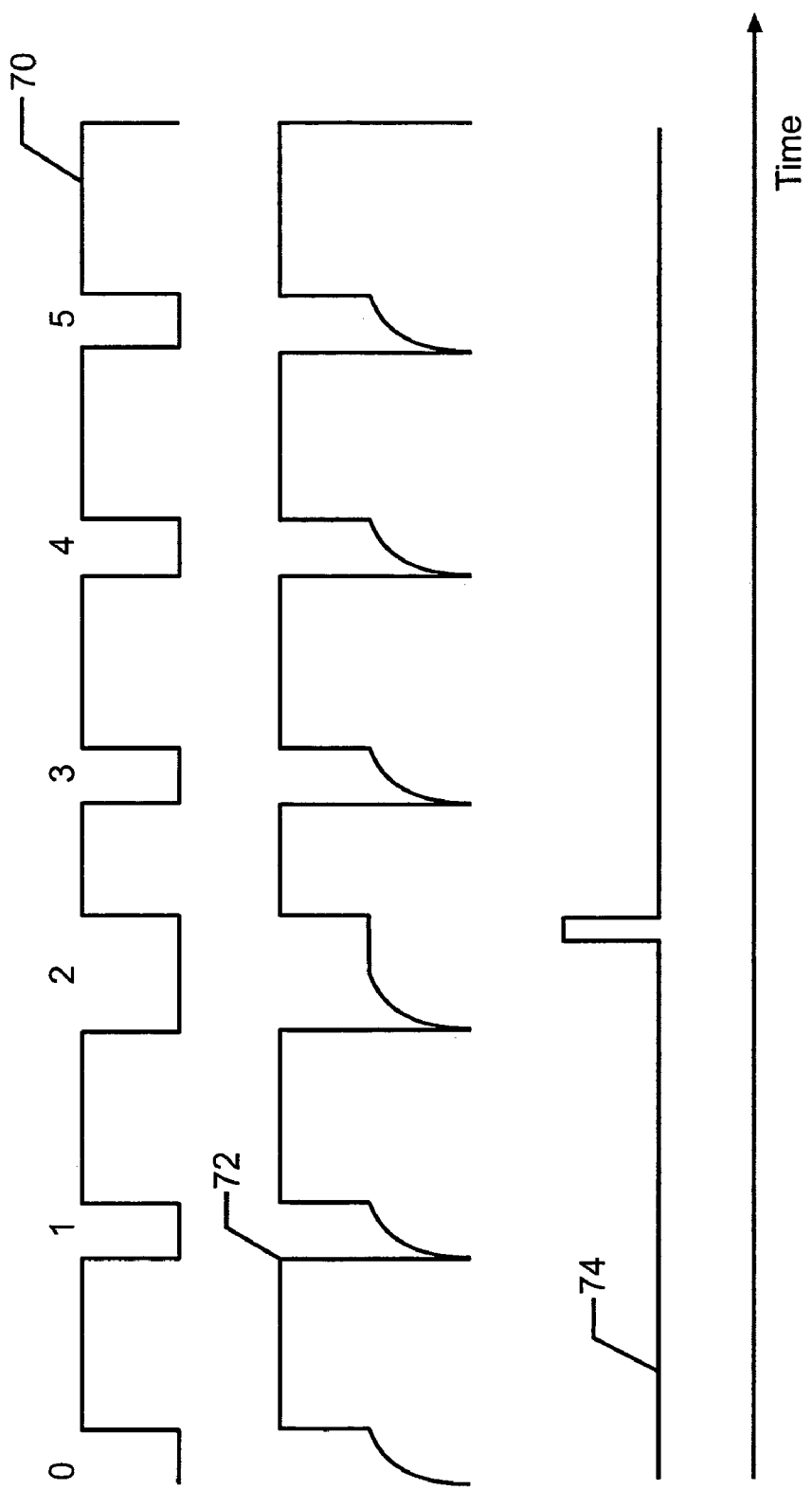
FIG. 3 is a graph including waveforms illustrating operation of the arrangement of FIG. 2.

The foregoing is illustrated by the waveforms presented in FIG. 3 wherein pulse-width modulated motor drive pulses are represented by waveform 70. The voltage appearing on the terminals of motor 12', from which back-e.m.f. can be determined, is represented by waveform 72. Waveform 74 shows control or timing pulses provided by microprocessor output 60 for causing back-e.m.f. sensor 44 to sample the motor back-e.m.f. only during selected and spaced-apart intervals between motor drive pulses. Successive intervals between motor drive pulses are numbered 0 through 5 at waveform 70. Interval 2 is extended to permit full recovery of the back-e.m.f. and provide sufficient time for back-e.m.f. sampling, according to properties of the motor and sampling circuit (FIG. 2-motor 12' and Back-e.m.f. Sampling 44). This is provided by a program stored in microprocessor 50. The pulse in waveform 74 indicates sampling back-e.m.f. accurately, during extended interval 2. The microprocessor commands PWM control 40 to delay the onset of such drive pulses under conditions when speed regulation would otherwise generate the drive pulse during the time when back-e.m.f. is measured. Nevertheless, the majority of drive pulses are unaffected by the sampling-time requirement, so that nearly all the voltage source is available to drive the motor.

By using the back-e.m.f. to adjust the PWM controlling the pump motor, battery run time may be extended because only as much energy is drawn from the battery as is needed. Further, it permits the use of an optimal pump and motor for the lowest battery voltage, without risk of damage at the highest battery voltage. Also, such a system reliably indicates low gas-flow rates, by reporting when the PWM can not sustain the target motor speed, thereby avoiding the hazard common in prior instruments resulting from the gradual onset of low flow.

Figure 4:
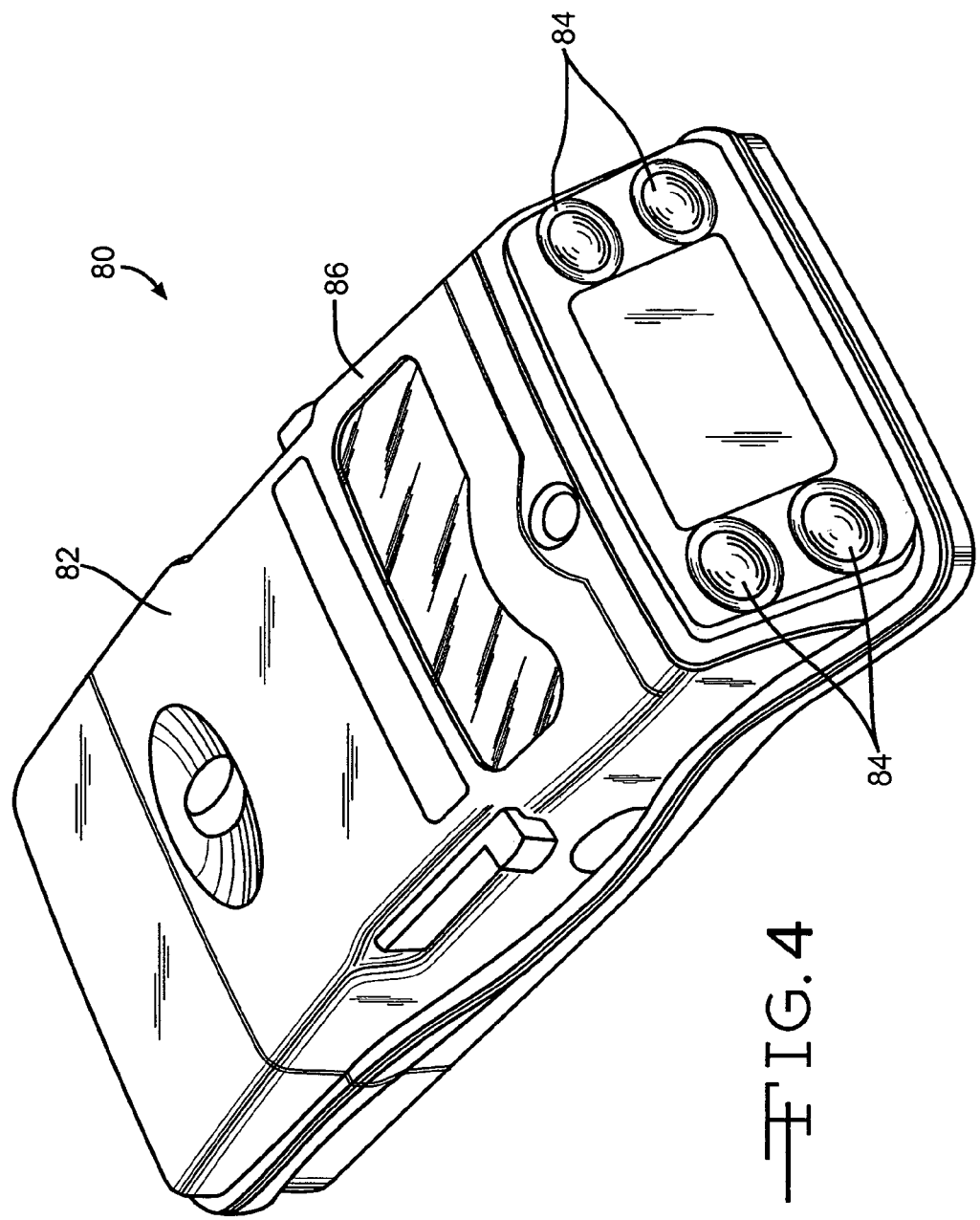
FIG. 4 is a perspective view of a form of gas monitoring instrument incorporating the invention.

FIG. 4 illustrates a portable, hand-held gas monitoring instrument 80 incorporating the invention. A housing 82 is the counterpart of enclosure 30 shown in FIG. 1, and housing 82 is of a size and shape such that instrument 80 can be hand-held and portable. A motor, pump, sensor and the arrangement of FIG. 2 are included within housing 82 which is provided with a port into which can be fitted a length of flexible tubing similar to tubing 24 of FIG. 1. The voltage source is a battery which also is included within housing 82. Various control buttons 84 are provided as one end of device 80 and a display 86 is located on housing 82 near the control buttons 84.

Although embodiments of the invention have been described herein, the invention is not limited to such embodiments. The claims which follow are directed to the invention, and are intended to further describe the invention, but are not intended to limit the scope of the invention.

The invention claimed is:

1. In a gas monitoring instrument having an electrically powered motor for driving a pump to bring a sample of gas from a location being tested to a sensor for determining the presence of contaminants in the gas, a motor speed control comprising:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed;
   c) means operatively connected to the means for sampling back-e.m.f. to provide a digital signal output containing information on the actual motor speed;
   d) a microprocessor connected to the output of the means to provide a digital signal and connected in controlling relation to the pulse modulation control and drive for comparing the actual motor speed to a desired motor speed for controlling the operation of the pulse modulation control; and
   e) means for connecting the microprocessor to the means for sampling back-e.m.f. for determining the intervals between modulated motor drive pulses during which motor back-e.m.f. is sampled.

2. The motor speed control according to claim 1, wherein the means for connecting the microprocessor to the means for sampling back-e.m.f. causes sampling of motor back-e.m.f. at a rate lower than the pulse rate of the modulated motor drive pulses.

3. In a gas monitoring instrument having an electrically powered motor for driving a pump to bring a sample of gas from a location being tested to a sensor for determining the presence of contaminants in the gas:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed which is indicative of pump flow rate; and
   c) a control operatively connected to the back-e.m.f. sampling means for determining the intervals between motor drive pulses during which motor back-e.m.f. is sampled to provide an indication of pump flow rate.

4. The apparatus according to claim 3, wherein the control causes sampling of motor back-e.m.f. at a rate lower than the pulse rate of motor drive pulses.

5. A method for monitoring the flow of gas in a gas monitoring instrument wherein a sample of gas is caused to flow from a location being tested to a sensor for determining the presence of contaminants in the gas, the method comprising:
   a) providing pulse modulation of a motor driving a pump which causes the flow of gas in the instrument;
   b) sampling motor back-e.m.f. during intervals between motor drive pulses to provide an indication of motor speed to determine the rate of flow of gas through the instrument; and
   c) selecting the intervals between motor drive pulses during which motor back-e.m.f. is sampled.

6. The method according to claim 5, wherein motor back e.m.f. is sampled at a rate lower than the pulse rate of motor drive pulses.

7. In a system having an electrically powered motor for driving a pump to bring a quantity of fluid from one location to another, a motor speed control comprising:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed;
   c) means operatively connected to the means for sampling back-e.m.f. to provide a digital signal output containing information on the actual motor speed;
   d) a microprocessor connected to the output of the means to provide a digital signal and connected in controlling relation to the pulse modulation control and drive for comparing the actual motor speed to a desired motor speed for controlling the operation of the pulse modulation control; and
   e) means for connecting the microprocessor to the means for sampling back-e.m.f. for determining the intervals between modulated motor drive pulses during which motor back-e.m.f. is sampled.

8. The motor speed control according to claim 7, wherein the means for connecting the microprocessor to the means for sampling back-e.m.f. causes sampling of motor back-e.m.f. at a rate lower than the pulse rate of motor drive pulses.

9. In a system having an electrically powered motor for driving a pump to bring a quantity of fluid from one location to another:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed which is indicative of pump flow rate; and
   c) a control operatively connected to the back-e.m.f. sampling means for determining the intervals between motor drive pulses during which motor back-e.m.f. is sampled to provide an indication of pump flow rate.

10. The apparatus according to claim 9, wherein the control causes sampling of motor back-e.m.f. at a rate lower than the pulse rate motor drive pulses.

11. A method for monitoring the flow of fluid in a fluid monitoring system wherein a quantity of fluid is caused to flow from one location to another, the method comprising:
   a) providing pulse modulation of a motor driving a pump which causes the flow of gas in the system;
   b) sampling motor back-e.m.f. during intervals between motor drive pulses to provide an indication of motor speed to determine the rate of flow of gas through the system; and
   c) selecting the intervals between motor drive pulses during which motor back-e.m.f. is sampled.

12. The method according to claim 11, wherein motor back-e.m.f. is sampled at a rate lower than the pulse rate of motor drive pulses.

13. A motor speed control comprising:
   a) a pulse modulation control and drive for connection between a source of voltage and a motor for controlling application of motor drive pulses to the motor;
   b) means operatively associated with the motor for sampling motor back-e.m.f. during intervals between motor drive pulses to provide an output indicative of actual motor speed;
   c) means operatively connected to the means for sampling back-e.m.f. to provide a digital signal output containing information on the actual motor speed;
   d) a microprocessor connected to the output of the means to provide a digital signal and connected in controlling relation to the pulse modulation control for comparing the actual motor speed to a desired motor speed for controlling the operation of the pulse modulation control; and
   e) means for connecting the microprocessor to the means for sampling back-e.m.f. for determining the intervals between modulated motor drive pulses during which motor back-e.m.f. is sampled.

14. The motor speed control according to claim 13, wherein the means for connecting the microprocessor to the means for sampling back-e.m.f. causes sampling of motor back-e.m.f. at a rate lower than the pulse rate of the modulated motor drive pulses.

15. A method for controlling motor speed comprising:
   a) providing pulse modulation control of motor voltage drive pulses applied to the motor;
   b) sampling motor back-e.m.f. during intervals between motor drive pulses;
   c) comparing the sampled back-e.m.f. indicative of actual motor speed to a signal indicative of desired motor speed for controlling the pulse modulation; and
   d) determining the intervals between modulated motor drive pulses during which motor back e.m.f. is sampled.

16. The method according to claim 15, wherein motor back-e.m.f. is sampled at a rate lower than the pulse rate of the modulated motor drive pulses.

17. In a gas monitoring instrument having an electrically powered motor for driving a pump to bring a sample of gas from a location being tested to a sensor for determining the presence of contaminants in the gas, a motor speed control comprising:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed;
   c) means operatively connected to the means for sampling back-e.m.f. to provide a digital signal output containing information on the actual motor speed;
   d) a microprocessor connected to the output of the means to provide a digital signal and connected in controlling relation to the pulse modulation control and drive for comparing the actual motor speed to a desired motor speed for controlling the operation of the pulse modulation control;
   e) means for connecting the microprocessor to the means for sampling back-e.m.f. for determining the intervals between modulated motor drive pulses during which motor back-e.m.f. is sampled; and
   f) wherein the microprocessor extends the interval between motor drive pulses during which back e.m.f. is sampled to provide full recovery of the back-e.m.f. and sufficient sampling time.

18. In a gas monitoring instrument having an electrically powered motor for driving a pump to bring a sample of gas from a location being tested to a sensor for determining the presence of contaminants in the gas:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed which is indicative of pump flow rate;
   c) a control operatively connected to the back-e.m.f. sampling means for determining the intervals between motor drive pulses during which motor back-e.m.f. is sample to provide an indication of pump flow rate; and
   d) wherein the control extends the interval between motor drive pulses during which back-e.m.f. is sampled to provide full recovery of the back-e.m.f. and sufficient sampling time.

19. A method for monitoring the flow of gas in a gas monitoring instrument wherein a sample of gas is caused to flow from a location being tested to a sensor for determining the presence of contaminants in the gas, the method comprising:
   a) proving pulse modulation control of motor driving a pump which causes the flow of gas in the instrument;
   b) sampling motor back-e.m.f. during intervals between motor drive pulses to provide an indication of motor speed to determine the rate of flow of gas through the instrument;
   c) selecting the intervals between motor drive pulses during which motor back-e.m.f. is sampled; and
   d) wherein the intervals between motor drive pulses during which back-e.m.f. is sampled is extended to provide full recovery of the back-e.m.f. and sufficient sampling time.

20. A method for monitoring the flow of gas in a gas monitoring instrument wherein a sample of gas is caused to flow from a location being tested to a sensor for determining the presence of contaminants in the gas, the method comprising:
   a) proving pulse modulation control of motor driving a pump which causes the flow of gas in the instrument;
   b) sampling motor back-e.m.f. during intervals between motor drive pulses to provide an indication of motor speed to determine the rate of flow of gas through the instrument;
   c) selecting the intervals between motor drive pulses during which motor back-e.m.f. is sampled; and
   d) wherein the indication of motor speed obtained from sampling motor back-e.m.f. is utilized to control the pulse modulation to control the motor speed and the rate of gas flow through the instrument.

21. The method according to claim 20, wherein the indication of motor speed is compared to a desired motor speed to provide a difference signal to control the pulse modulation.

22. In a system having an electrically powered motor for driving a pump to bring a quantity of fluid from one location to another, a motor speed control comprising:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed;
   c) means operatively connected to the means for sampling back-e.m.f. to provide a digital signal output containing information on the actual motor speed;
   d) a microprocessor connected to the output of the means to provide a digital signal and connected in controlling relation to the pulse modulation control and drive for comparing the actual motor speed to a desired motor speed for controlling the operation of the pulse modulation control;
   e) means for connecting the microprocessor to the means for sampling back-e.m.f. for determining the intervals between modulated motor drive pulses during which motor back-e.m.f. is sampled; and
   f) wherein the microprocessor extends the interval between motor drive pulses during which back e.m.f. is sampled to provide full recovery of the back-e.m.f. and sufficient sampling time.

23. In a system having an electrically powered motor for driving a pump to bring a quantity of fluid from one location to another:
   a) a pulse modulation control and drive operatively connected between a source of voltage and the motor for controlling application of voltage drive pulses to the motor;
   b) means operatively associated with the motor for sampling motor back-e.m.f. during intervals between motor drive pulses to provide an output indicative of actual motor speed which is indicative of pump flow rate;
   c) a control operatively connected to the back-e.m.f. sampling means for determining the intervals between motor drive pulses during which motor back-e.m.f. is sampled to provide an indication of pump flow rate; and
   d) wherein the control extends the interval between motor drive pulses during which back-e.m.f. is sampled to provide full recovery of the back-e.m.f. and sufficient sampling time.

24. A method for monitoring the flow of fluid in a fluid monitoring system wherein a quantity of fluid is caused to flow from one location to another, the method comprising:

a) providing pulse modulation of a motor driving a pump which causes the flow of gas in the system;
b) sampling motor back-e.m.f. during intervals between motor drive pulses to provide an indication of motor speed to determine the rate of flow of gas through the system;
c) selecting the intervals between motor drive pulses during which motor back-e.m.f. is sampled; and
d) wherein the interval between motor drive pulses during which back-e.m.f. is sampled is extended to provide full recovery of the back-e.m.f. and sufficient sampling time.

25. A method for monitoring the flow of fluid in a fluid monitoring system wherein a quantity of fluid is caused to flow from one location to another, the method comprising:
a) providing pulse modulation of a motor driving a pump which causes the flow of gas in the system;
b) sampling motor back-e.m.f. during intervals between motor drive pulses to provide an indication of motor speed to determine the rate of flow of gas through the system;
c) selecting the intervals between motor drive pulses during which motor back-e.m.f. is sampled; and
d) wherein the indication of motor speed obtained from sampling motor back-e.m.f. is utilized to control the pulse modulation to control the motor speed and the rate of fluid flow through the system.

26. The method according to claim 25, wherein the indication of motor speed is compared to a desired motor speed to provide a difference signal to control the pulse modulation.

27. A motor speed control comprising:
a) a pulse modulation control and drive for connection between a source of voltage and a motor for controlling application of motor drive pulses to the motor;
b) means operatively associated with the motor for sampling motor back-e.m.f. during intervals between motor drive pulses to provide an output indicative of actual motor speed;
c) means operatively connected to the means for sampling back-e.m.f. to provide a digital signal output containing information on the actual motor speed;
d) a microprocessor connected to the output of the means to provide a digital signal and connected in controlling relation to the pulse modulation control for comparing the actual motor speed to a desired motor speed for controlling the operation of the pulse modulation control;
e) means for connecting the microprocessor to the means for sampling back-e.m.f. for determining the intervals between modulated motor drive pulses during which motor back-e.m.f. is sampled; and
f) wherein the microprocessor extends the interval between motor drive pulses during which back-e.m.f. is sampled to provide full recovery of the back-e.m.f. and sufficient sampling time.

28. A method for controlling motor speed comprising:
a) proving pulse modulation control of motor voltage drive pulses applied to the motor;
b) sampling motor back-e.m.f. during intervals between motor drive pulses;
c) comparing the sampled back-e.m.f. indicative of actual motor speed to a signal indicative of desired motor speed for controlling the pulse modulation;
d) determining the intervals between modulated motor drive pulses during which motor back e.m.f. is sampled; and e) wherein the interval between motor drive pulses during which back-e.m.f. is sampled is extended to provide full recovery of the back-e.m.f. and sufficient sampling time.

29. A gas monitoring instrument comprising:
a) a sensor for determining the presence of contaminants in the gas;
b) an inlet for receiving a sample of gas from a location being tested;
c) a pump to bring the sample of gas to the sensor;
d) an electronically powered motor for driving the pump;
e) a pulse modulation control and drive operatively connected between a source of voltage and the motor for controlling application of voltage drive pulses to the motor;
f) means operatively associated with the motor for sampling motor back-e.m.f. during intervals between motor drive pulses to provide an output indicative of actual motor speed which is indicative of pump flow rate; and
g) a control operatively connected to the back-e.m.f. sampling means for determining the intervals between motor drive pulses during which motor back-e.m.f. is sampled to provide an indication of pump flow rate.

30. The instrument according to claim 29, wherein the control causes sampling of motor back-e.m.f. at a rate lower than the pulse rate of motor drive pulses.

31. The instrument according to claim 29, wherein the control extends the interval between motor drive pulses during which back-e.m.f. is sampled to provide full recovery of the back-e.m.f. and sufficient sampling time.

32. A gas monitoring instrument comprising:
a) a sensor for determining the presence of contaminants in the gas;
b) an inlet for receiving a sample of gas from a location being tested;
c) a pump to bring., the sample of gas to the sensor;
d) an electrically powered motor for driving the pump;
e) a pulse modulation control and drive operatively connected between a source of voltage and the motor for controlling application of voltage drive pulses to the motor;
f) means operatively associated with the motor for sampling motor back-e.m.f. during intervals between motor drive pulses to provide an output indicative of actual motor speed;
g) means operatively connected to the means for sampling back-e.m.f. to provide a digital signal output containing information on the actual motor speed;
h) a microprocessor connected to the output of the means to provide a digital signal and connected in controlling relation to the pulse modulation control and drive for comparing the actual motor speed to a desired motor speed for controlling the operation of the pulse modulation control; and
i) means for connecting the microprocessor to the means for sampling back-e.m.f. for determining the intervals between modulated motor drive pulses during which motor back-e.m.f. is sampled.

33. The motor speed control according to claim 1, wherein the means for connecting the microprocessor to the means for sampling back-e.m.f. causes sampling of motor back-e.m.f. at a rate lower than the pulse rate of the modulated motor drive pulses.

34. The motor speed control according to claim 1, wherein the microprocessor extends the interval between motor drive pulses during which back-e.m.f. is sampled to provide full recovery of the back-e.m.f. and sufficient sampling time.

* * * * *